United States Patent [19]

Iwasaki

[11] Patent Number: 5,987,265
[45] Date of Patent: Nov. 16, 1999

[54] PHOTOMETRY DEVICE OF CAMERA

[75] Inventor: Hiroyuki Iwasaki, Yokohama, Japan

[73] Assignee: Nikon Corporation, Tokyo, Japan

[21] Appl. No.: 09/037,881

[22] Filed: Mar. 10, 1998

[30]        Foreign Application Priority Data

Mar. 10, 1997   [JP]   Japan .................................. 9-054651

[51] Int. Cl.⁶ ..................................................... G03B 7/00

[52] U.S. Cl. ........................... 396/225; 396/234; 396/63; 396/65

[58] Field of Search ................................... 396/63, 65, 67, 396/70, 225, 233, 234

[56]              References Cited

U.S. PATENT DOCUMENTS

5,596,387   1/1997   Takagi ................................ 396/225 X
5,606,391   2/1997   Aoki et al. .............................. 396/225

*Primary Examiner*—W. B. Perkey

[57]              ABSTRACT

A photometry device of a camera has a photometry circuit which measures the luminance value of the object field, a colorimetry circuit which measures the color balance of the object field, and a scene discrimination unit which discriminates the scene on the basis of the output from the colorimetry circuit. The device calculates the proper exposure value of the object field on the basis of the outputs from the photometry circuit and scene discrimination unit. Scene discrimination is preferably made using photographing mode information, photographing distance information, or current time information to improve discrimination accuracy.

11 Claims, 10 Drawing Sheets

PHOTOMETRY DEVICE OF CAMERA

The entire disclosure of Japanese Patent Application No. 9-054561 including specification, claims, drawings and summary is incorporated herein by reference in its entirety.

BACKGROUND OF THE INVENTION

1. Field of the Invention

The present invention relates to a photometry device for measuring the luminance of an object and, more particularly, to a photometry device of a camera, which is used in automatic exposure control of the camera.

2. Description of the Related Background Art

Figure 10A:
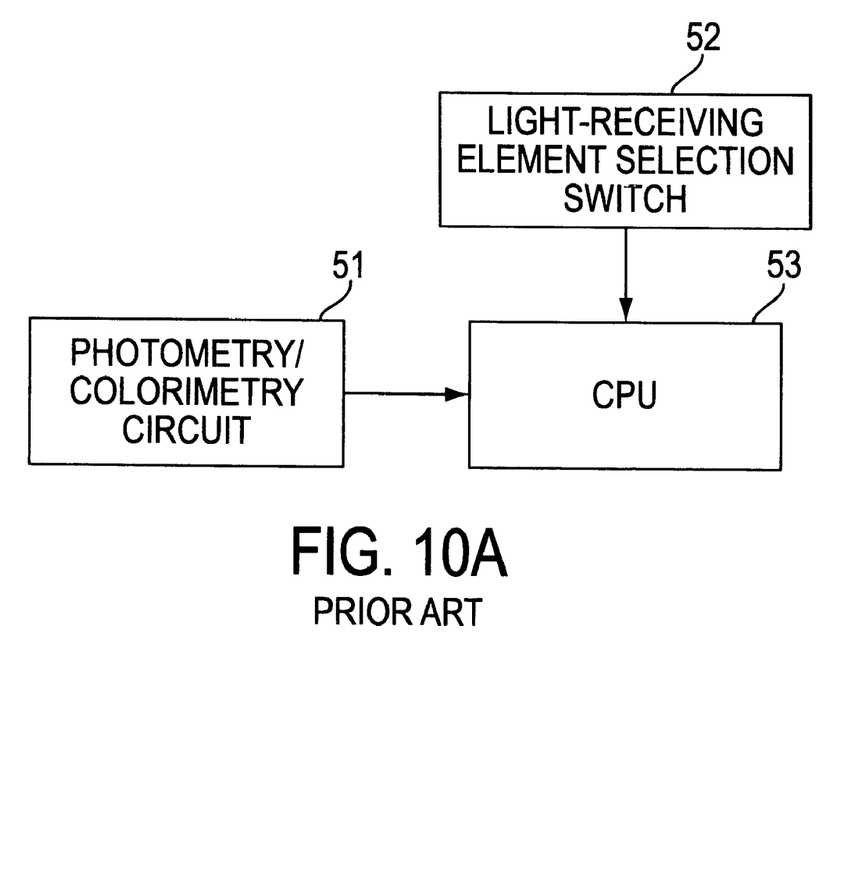
FIGS. 10A and 10B show the prior art.
Figure 10B:
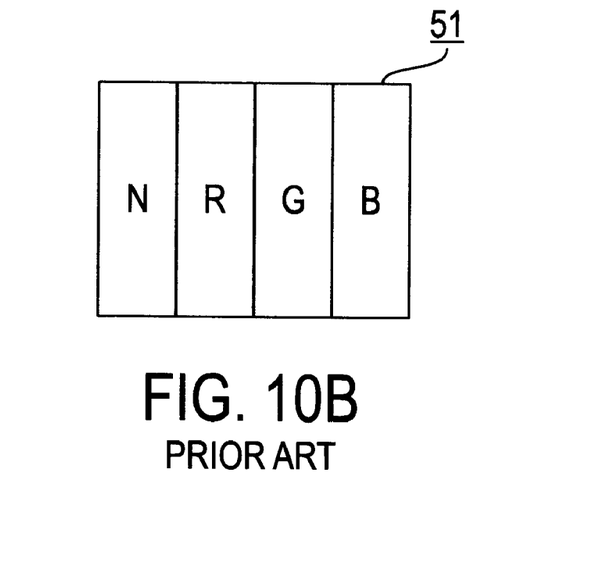

As a conventional device of this type, a device described in Japanese Patent Application Laid-Open No. 3-15726 is known. As shown in FIG. 10A, the device comprises a photometry/colorimetry circuit 51, a light-receiving element selection switch 52, and a CPU 53. Photometry is done by selecting a light-receiving element of the photometry/colorimetry circuit 51 by the light-receiving element selection switch 52 in accordance with the color of the object to be photographed or the light source color, and the CPU 53 calculates the proper exposure value. As the light-receiving elements of the photometry/colorimetry circuit 51, a luminance photometry element N, red photometry element R, green photometry element G, and blue photometry element B are mounted on a single chip, as shown in FIG. 10B.

Currently, a built-in photometry device of a camera or the like is so-called a reflected-light exposure meter. The photometry device measures light reflected by the object illuminated by a light source, and calculates the proper exposure value. The photometry device of this type can easily attain photometry from the photographer side, but is readily influenced by the light reflectance (to be simply referred to as reflectance hereinafter) of the object as compared to an incident-light exposure meter which directly measures a light beam which becomes incident on the object at a certain position of the object. That is, the reflected-light exposure meter recognizes an object with higher reflectance to be lighter than an object having lower reflectance even under the same illumination, and gives a relatively underexposure value to the object with higher reflectance and a relatively overexposure value to the object with lower reflectance. As a result, both a whitish object with high reflectance and blackish object with low reflectance are expressed by neutral gray in a picture.

Recently, a photometry device which divides the object field into plural regions and measures the object field by divisional photometry, analyzes the scene to be photographed by comparing the luminance values of the plurality of regions, and gives an exposure value which is relatively independent from the reflectance of the object has been developed.

Meanwhile, some scenes cannot be discriminated by divisional photometry alone: for example, a sunset glow scene, and a daytime scene with the same composition. These two scenes are determined to be nearly the same scene by normal divisional photometry. However, the exposure value should be adjusted to the sunset glow sky in the sunset glow scene even when it is too underexposure a value for the foreground object, while the exposure value should be adjusted to the foreground object in the daytime scene.

Hence, the conventional photometry device switches light-receiving elements in accordance with the object color or light source color, and performs photometry using light-receiving elements having different spectral sensitivities in the sunset glow and daytime scenes, thereby giving proper exposure values to these scenes.

However, with such a conventional photometry device, the photographer himself or herself must discriminate the object color or light source color to switch the light-receiving elements, resulting in complicated operations.

SUMMARY OF THE INVENTION

It is, therefore, an object of the present invention to provide a photometry device of a camera, which discriminates scenes with different object colors, light source colors, or the like and gives proper exposure values to these scenes.

A photometry device of the present invention comprises a photometry circuit which measures a luminance value of an object field, a colorimetry circuit which measures a color balance of the object field, a scene discrimination unit which discriminates a scene on the basis of an output from the colorimetry circuit, and an exposure calculation unit which calculates a proper exposure value of the object field on the basis of outputs from the photometry circuit and scene discrimination unit. With this arrangement, since the scene of the object field can be adequately discriminated on the basis of the color balance information of the object field, the probability of photographing with proper exposure can be raised.

In the photometry device, the photometry circuit and colorimetry circuit may respectively perform measurements using outputs from different light-receiving elements. When different light-receiving elements are used in photometry and colorimetry, the luminance and color can be measured under optimal conditions without overloading each other's measurements.

On the other hand, the photometry circuit and colorimetry circuit may respectively perform the measurements using different optical systems. When different optical systems are used in photometry and colorimetry, the luminance and color can be measured under optimal conditions.

In the photometry device of the camera of the present invention, when the photometry circuit performs the measurement by dividing the object field into a plurality of regions, performance of scene discrimination and proper exposure operation can be improved.

In the photometry device of the camera of the present invention, when the colorimetry circuit measures the color balance of the entire object field, proper scene discrimination can be realized.

In the photometry device of the camera of the present invention, when the colorimetry circuit performs the measurement without using any photometry re-focusing lens, the color of the entire photographing frame can be measured with a simple arrangement.

In the photometry device of the camera according to one mode of the present invention, when a ratio of a red output to a green output is larger than a first predetermined value, and a ratio of a blue output to the green output is smaller than a second predetermined value, the scene discrimination unit determines that a scene to be photographed is an evening scene, since the color balance of the object field has a magenta to red tendency.

In the photometry device of the camera according to one mode of the present invention, when a ratio of a red output to a green output falls within a range between a third predetermined value and a fourth predetermined value, and a ratio of a blue output to the green output is smaller than a fifth predetermined value, the scene discrimination unit determines that a scene to be photographed is a yellowish scene, since the color balance of the object field has a yellow tendency.

In the photometry device of the camera according to one mode of the present invention, when a ratio of a red output to a green output is smaller than a sixth predetermined value, and a ratio of a blue output to the green output is smaller than a seventh predetermined value, the scene discrimination unit determines that a scene to be photographed is a scene under illumination of a fluorescent lamp, since the entire color balance of the object field has a green tendency.

In the photometry device of the camera according to one mode of the present invention, when a ratio of a red output to a green output is larger than an eighth predetermined value, and a ratio of a blue output to the green output is smaller than a ninth predetermined value, the scene discrimination unit determines that a scene to be photographed is a scene under illumination of a tungsten lamp, since the entire color balance of the object field has a red tendency.

In the photometry device of the camera of the present invention, when the scene discrimination unit performs scene discrimination additionally using photographing distance information, scene discrimination can be attained more accurately.

In the photometry device of the camera of the present invention, when the scene discrimination unit determines an evening scene, the exposure calculation unit determines the exposure value while placing an importance on a high-luminance portion within the frame if the photographing magnification is larger than a predetermined value, or determines the exposure value while placing an importance on both high- and low-luminance portions within the frame when the photographing magnification is equal to or lower than the predetermined value, thus attaining photographing with a more appropriate exposure value.

In the photometry device of the camera of the present invention, when the scene discrimination unit performs scene discrimination additionally using time information, scene discrimination can be done more accurately.

In the photometry device of the camera of the present invention, when the scene discrimination unit performs scene discrimination additionally using photographing mode information (program mode information), scene discrimination can be attained more accurately.

DESCRIPTION OF THE PREFERRED EMBODIMENTS

The preferred embodiments of the present invention will be described below with reference to the accompanying drawings.

Figure 1:
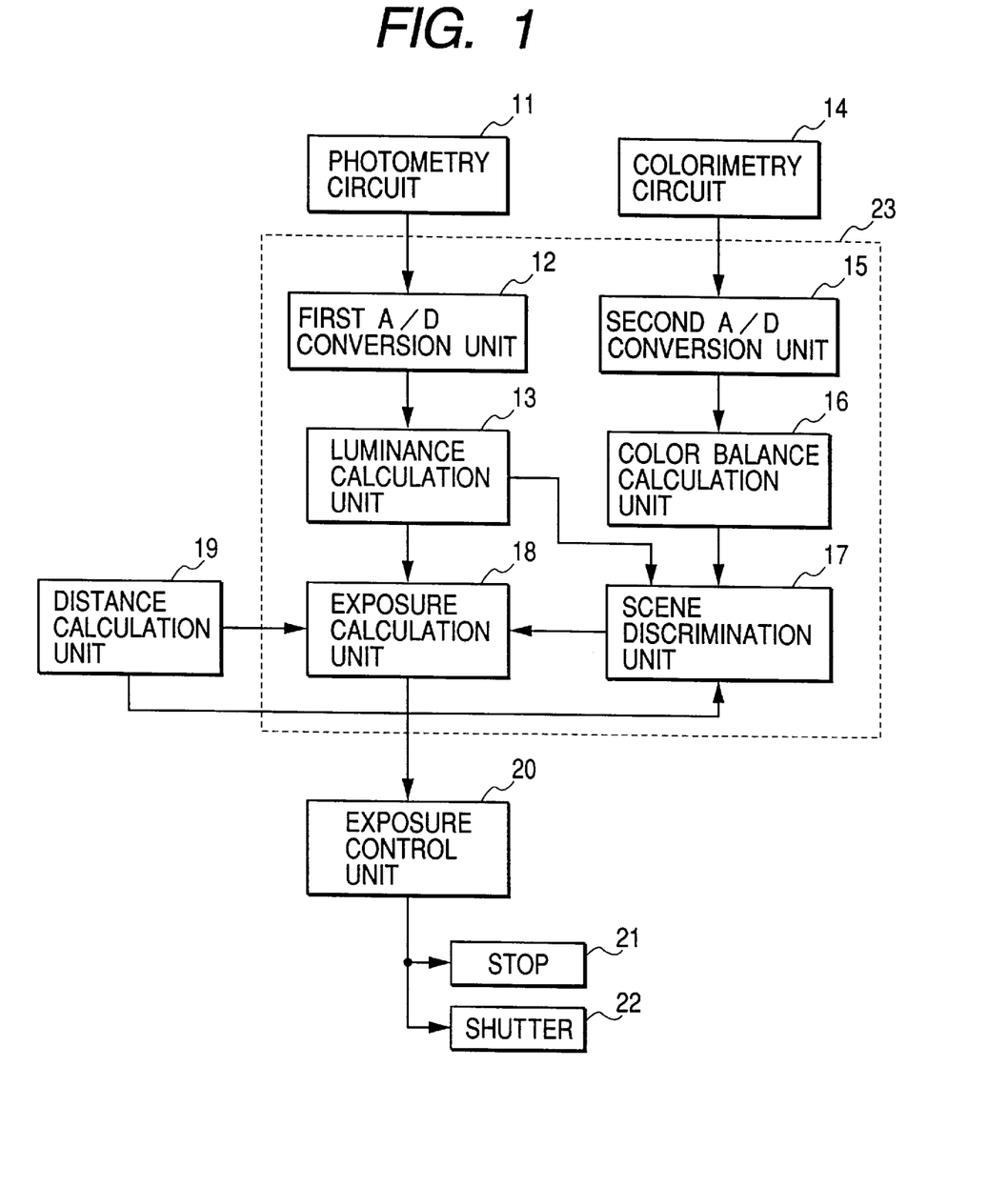
FIG. 1 is a block diagram showing the arrangement of a photometry device of a camera according to the present invention.

FIG. 1 is a schematic block diagram showing the arrangement of a photometry device of a camera according to the present invention.

A photometry circuit 11 measures the luminance of the object field using a light-receiving element such as an SPD (silicon photodiode) or the like, and its photometry output is connected to a first A/D conversion unit 12.

The first A/D conversion unit 12 converts the photometry output into numerical photometry data, which is output to a luminance calculation unit 13.

The luminance calculation unit 13 converts the converted photometry data into an absolute luminance value, and its output is connected to a scene discrimination unit 17 and exposure calculation unit 18.

On the other hand, a colorimetry circuit 14 measures light coming from the object field while separating it into a plurality of color components, and its colorimetry output is connected to a second A/D conversion unit 15. The colorimetry circuit 14 may use basically the same light-receiving element as an SPD, and color filters having different spectral transmittance characteristics are mounted on the chip of the light-receiving element. The spectral transmittance characteristics of the light-receiving element will be described in detail later.

The second A/D conversion unit 15 numerically converts the colorimetry output, and its output is connected to a color balance calculation unit 16.

The color balance calculation unit 16 calculates the color balance of the object field on the basis of the output from the second A/D conversion unit 15, and its output is connected to the scene discrimination unit 17.

The scene discrimination unit 17 discriminates the photographing scene on the basis of the outputs from the luminance calculation unit 13 and color balance calculation unit 16, and its output is connected to the exposure calculation unit 18.

The exposure calculation unit 18 calculates the proper exposure value of the object field on the basis of the outputs from the scene discrimination unit 17 and a distance calculation unit 19 (to be described below).

The distance calculation unit 19 reads, for example, information of a distance encoder attached to a photographing lens, and calculates the photographing distance at that time. The exposure calculation unit 18 can use the photographing distance information in calculation of the exposure value. The photographing distance information is also supplied from the distance calculation unit 19 to the scene discrimination unit 17. When the distance information is also used in scene discrimination, the scene can be discriminated more accurately.

An exposure control unit 20 controls a stop 21 and shutter 22 to a proper value on the basis of the output from the exposure calculation unit 18, when it is detected based on a release signal (not shown) that the photographer has pressed a release button.

Note that the first A/D conversion unit 12, second A/D conversion unit 15, luminance calculation unit 13, color balance calculation unit 16, scene discrimination unit 17, and exposure calculation unit 18 are all implemented by a 1-chip microcomputer 23.

Figure 2:
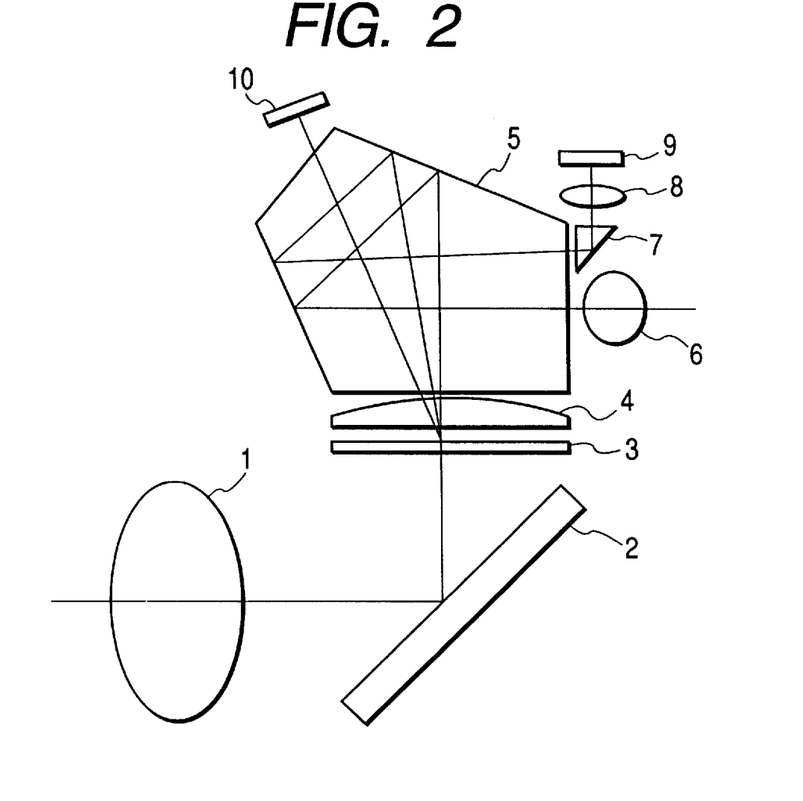
FIG. 2 is a block diagram showing an optical system of the embodiment shown in FIG. 1.

FIG. 2 is a block diagram showing an optical system of the embodiment of the present invention.

After a light beam has passed through a photographing lens 1, it reaches the photographer's eye via a quick return mirror 2, diffusion screen 3, condenser lens 4, pentagonal prism 5, and eyepiece lens 6. Some light components of the light beam are diffused by the diffusion screen 3, and then reach a photometry light-receiving element 9 via the condenser lens 4, the pentagonal prism 5, a photometry prism 7, and a photometry lens 8.

On the other hand, after some other light components of the light beam are diffused by the diffusion screen 3 and pass through the condenser lens 4, they leave the pentagonal prism 5 from its middle portion and are guided to a colorimetry light-receiving element 10. Since no re-imaging lens is inserted before the colorimetry light-receiving element 10, the light-receiving element 10 measures the entire photographing frame having the optical axis as the center.

Figure 3:
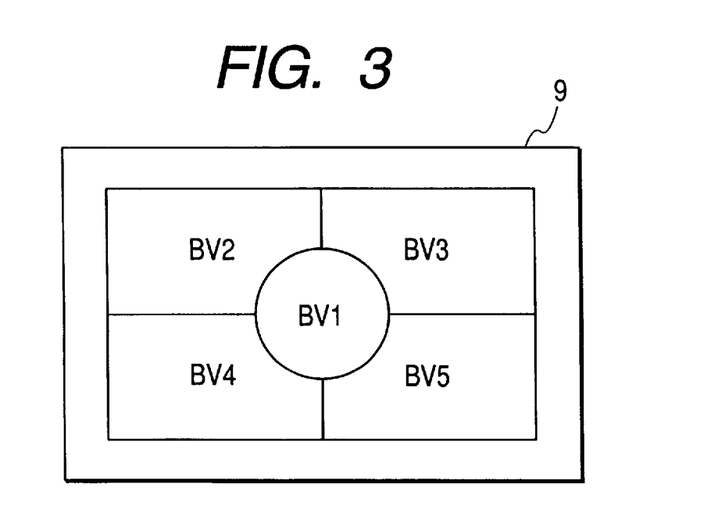
FIG. 3 is a view showing the divided state of divisional photometry of the embodiment shown in FIG. 1.

FIG. 3 shows the divided state of the photometry light-receiving element 9 in correspondence with the object field.

The photometry light-receiving element 9 performs photometry while dividing nearly the entire frame of the object field into five regions, and can output their photometry values BV1 to BV5.

Figure 4:
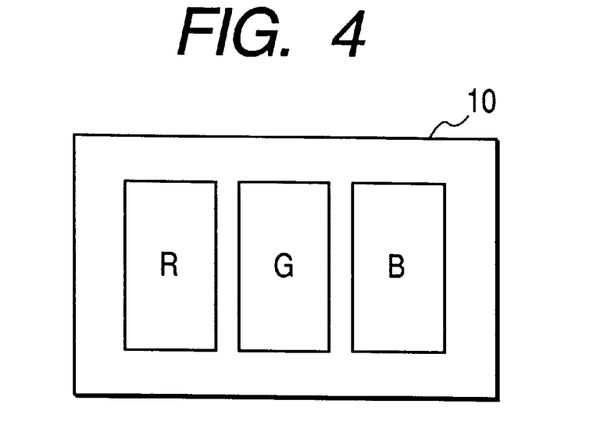
FIG. 4 is a view showing a photometry light-receiving element of the embodiment shown in FIG. 1.

FIG. 4 schematically shows the state of the light-receiving surface of the photometry light-receiving element 9.

As shown in FIG. 4, the light-receiving surface has three, independent photoelectric conversion portions, and R, G, and B color filters having three different spectral sensitivity characteristics are mounted on the light-receiving surfaces of these portions.

Figure 5:
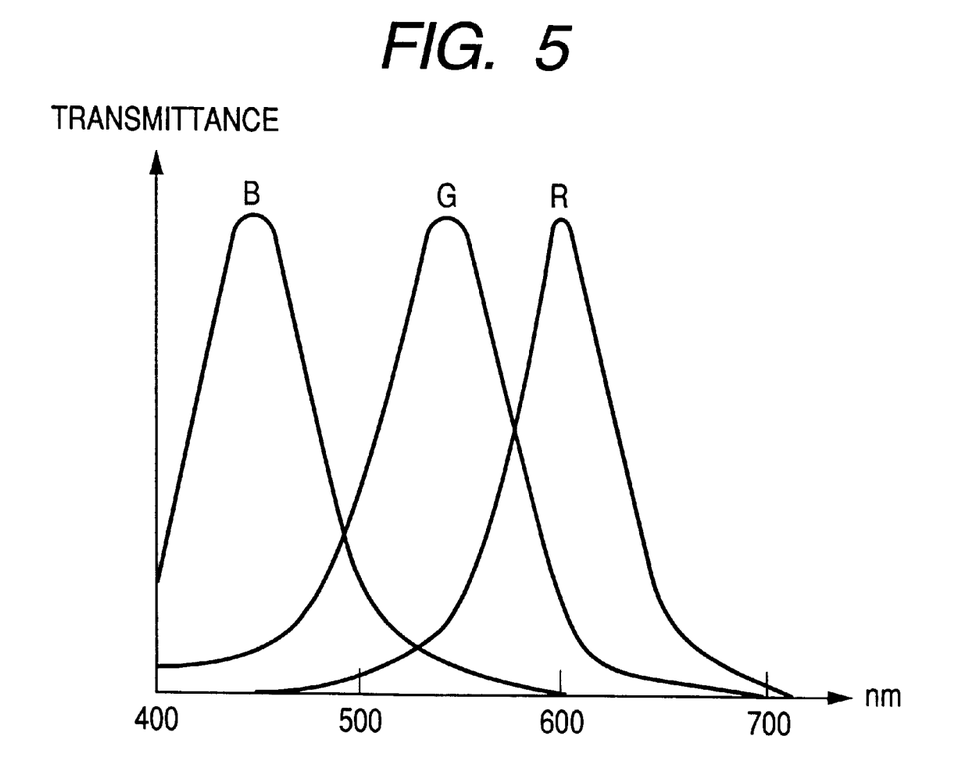
FIG. 5 is a graph showing the spectral sensitivity of the photometry light-receiving element of the embodiment shown in FIG. 1.

FIG. 5 shows the spectral transmittance characteristics of the R, G, and B color filters mounted on the light-receiving surface of the colorimetry light-receiving element 10, i.e., the distributions of transmittance with respect to light of the respective wavelengths.

As shown in FIG. 5, the R, G, and B color filters respectively transmit the wavelength ranges of 600 to 700 nm, 500 to 600 nm, and 400 to 500 nm, respectively.

Figure 6:
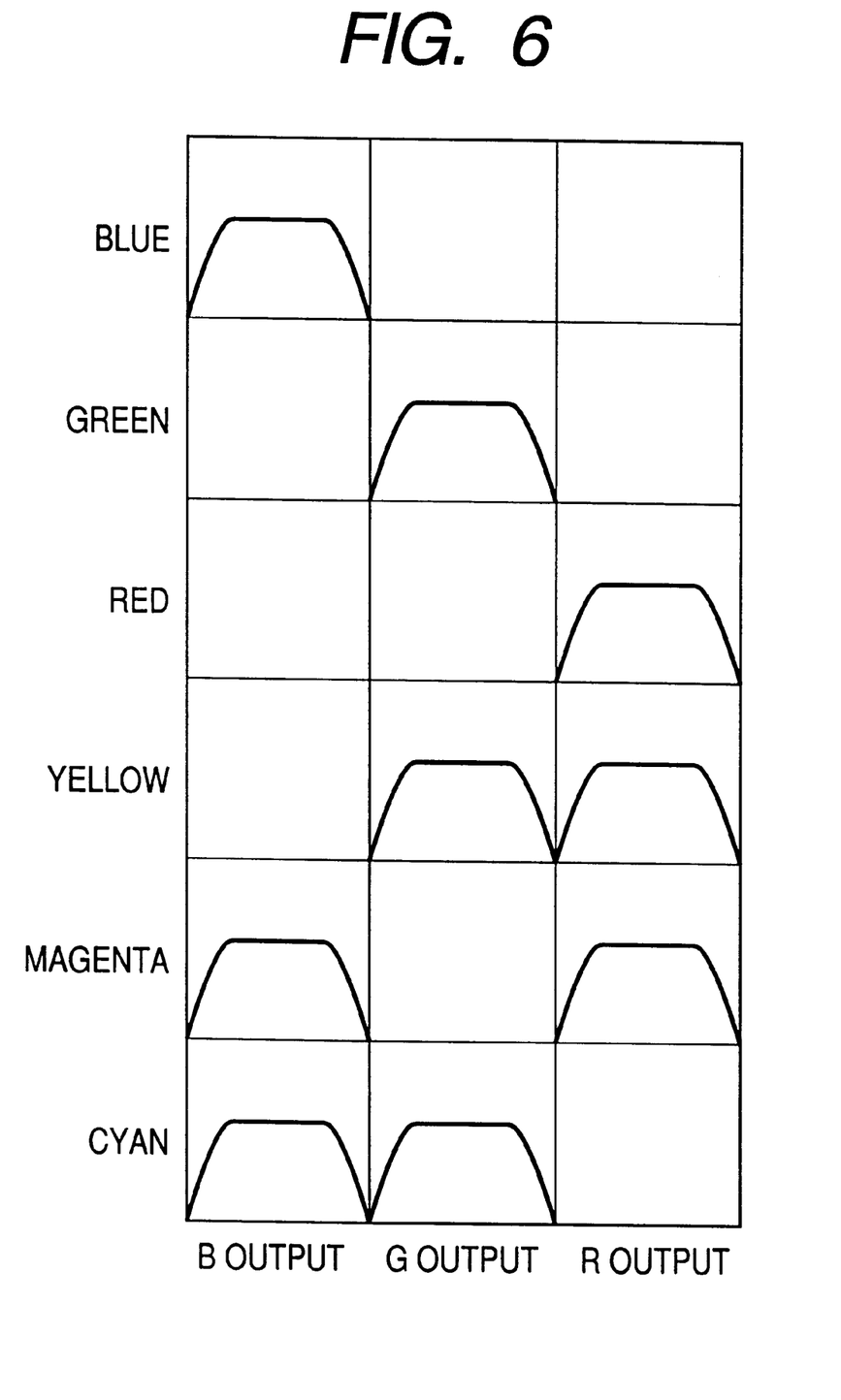
FIG. 6 is a view showing the relationship between the outputs of a colorimetry circuit and the object colors of the embodiment shown in FIG. 1.

FIG. 6 simply shows the relationship between the outputs from the colorimetry light-receiving element 10 and the corresponding object colors.

In FIG. 6, a trapezoidal pattern in each block indicates that the corresponding color output is dominant. Since the B output is dominant in the uppermost row of FIG. 6, blue is determined as the object color. Similarly, when the G output is dominant in the second row, green is determined; when the R output is dominant in the third row, red is determined. On the other hand, when both the G and R outputs are nearly equally dominant like in the fourth row, yellow is determined as the object color. Likewise, when both the B and R outputs are dominant like in the fifth row, magenta is determined; when both the B and G outputs are dominant like in the sixth row, cyan is determined.

Figure 7:
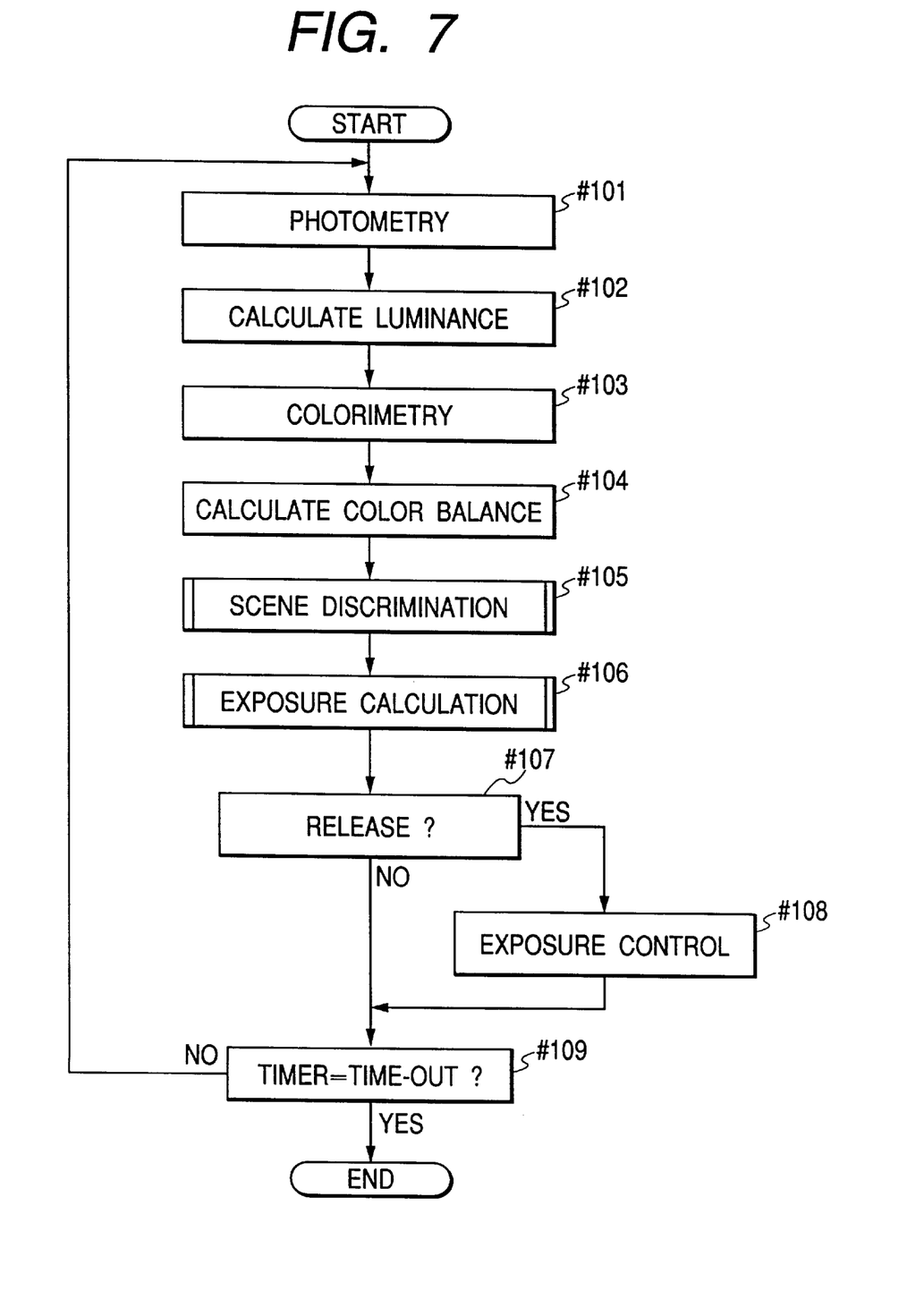
FIG. 7 is a flow chart showing the algorithm of the embodiment shown in FIG. 1.

FIG. 7 is a main flow chart showing the program of the microcomputer 23 of the photometry device of the camera according to this embodiment.

When the release button (not shown) of the camera has been pressed to its half stroke position, the power supply of the camera is turned on, and this program is executed.

In step #101, photometry is done by the photometry circuit 11, and the photometry output is numerically converted by the first A/D conversion unit 12 to obtain photometry data. The photometry data is input to the microcomputer 23.

In step #102, the luminance calculation unit 13 calculates luminance values BV1 to BV5 of the object field on the basis of the obtained photometry data.

In step #103, the colorimetry circuit 14 measures the color of the object field, and its output is numerically converted into colorimetry data by the second A/D conversion unit 15. The colorimetry data is input to the microcomputer 23.

In step #104, the color balance of the object field is calculated based on the obtained colorimetry data.

In step #105, the scene of the object field is discriminated based on the obtained absolute luminance value and color balance value. The scene discrimination method will be described in detail later.

In step #106, a proper exposure value for the object field is calculated on the basis of the scene discrimination result, calculated absolute luminance value, and the like. The proper exposure value calculation method will also be described in detail later.

In step #107, it is checked if the release button (not shown) has been pressed to its full stroke position. If Y (YES) in step #107, the stop 21 and shutter 22 are controlled based on the proper exposure value calculated in step #106 to expose the film; otherwise, the flow directly advances to step #109.

In step #109, it is checked using a half depression timer if a predetermined period of time has elapsed after the half depression of the release button was released. If the release button is kept pressed to its half stroke position, or the timer has not reached a time-out state, the flow returns to step #101 to repeat the processing; otherwise, the program ends.

Figure 8:
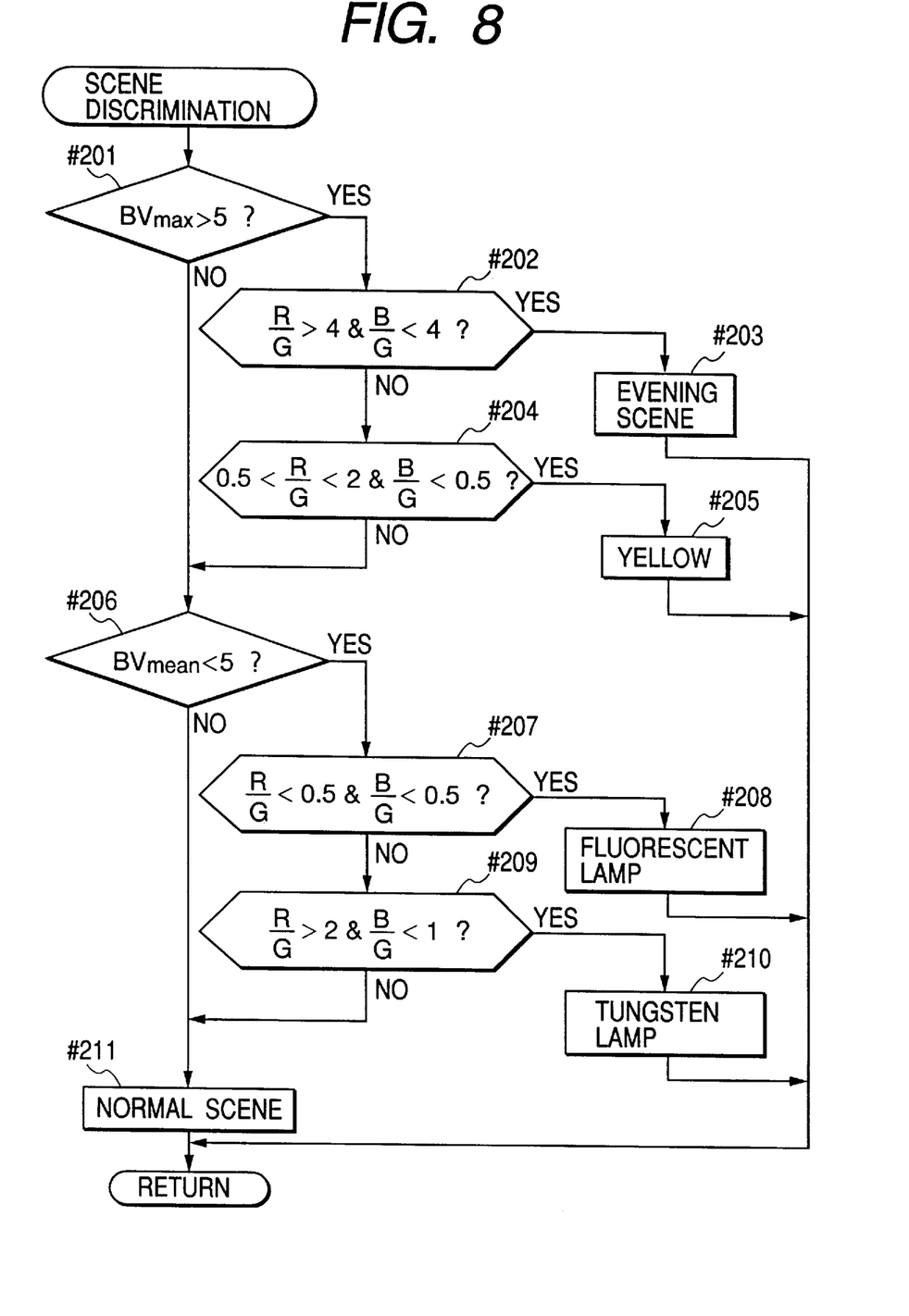
FIG. 8 is a flow chart showing the algorithm of the embodiment shown in FIG. 1.

FIG. 8 is a flow chart showing the subroutine for discriminating the scene of the object field.

Upon execution of step #105 in FIG. 7, this subroutine is called and executed.

In step #201, it is checked if BVmax is larger than 5 (BV). Note that BVmax indicates the maximum luminance value among the divisional photometry values BV1 to BV5 shown in FIG. 3. Also, unit (BV) indicates the absolute luminance value.

If BVmax>5, i.e., if it is determined that the object field is as light as the outdoor in the daytime, the flow advances to step #202 to check if R/G>4 and B/G<4. Note that R, G, and B are the colorimetry outputs from the colorimetry circuit 14. More specifically, in this step, it is checked if the R output is larger than a value four times the G output, and the B output is smaller than a value four times the G output, i.e., if the color balance of the object field has a magenta to red tendency. If Y in step #202, the flow advances to step #203 to determine that the scene is an evening scene.

On the other hand, if N (NO) in step #202, the flow advances to step #204 to check if 0.5<R/G<2 and B/G<0.5. More specifically, in this step, it is checked if the R output falls within the range from a value 0.5 times the G output to a value twice the G output, and the B output is smaller than half the G output, i.e., if the color balance of the object field has a yellow tendency. If Y in step #204, the flow advances to step #205 to determine that the scene is a yellowish scene.

If N in step #201, the flow advances to step #206 to check if BVmean<5 (BV). Note that BVmean is the mean value of the absolute luminance values BV1 to BV5.

If Y in step #206, i.e., if the mean luminance of the object field is lower than 5 (BV) and indoor photographing is determined, it is checked in step #207 if R/G<0.5 and B/G<0.5

If Y in step #207, i.e., if both the R and B outputs are equal to or smaller than half the G output, and the entire frame is greenish, it is determined that color fog arising from indoor fluorescent lamp illumination has been produced, i.e., it is determined in step #208 that photographing is being done under the fluorescent lamp illumination.

If N in step #207, it is checked in step #209 if R/G>2 and B/G<1. If Y in step #209, i.e., if the R output is larger than twice the G output, and the B output is smaller than G output, it is determined that the entire frame has a red tendency, and color fog arising from tungsten lamp illumination has been produced, i.e., a tungsten lamp-illuminated scene is determined in step #210.

If N in step #206, it is determined that the scene is the normal one that requires no scene discrimination based on the color balance, thus ending this subroutine.

Figure 9:
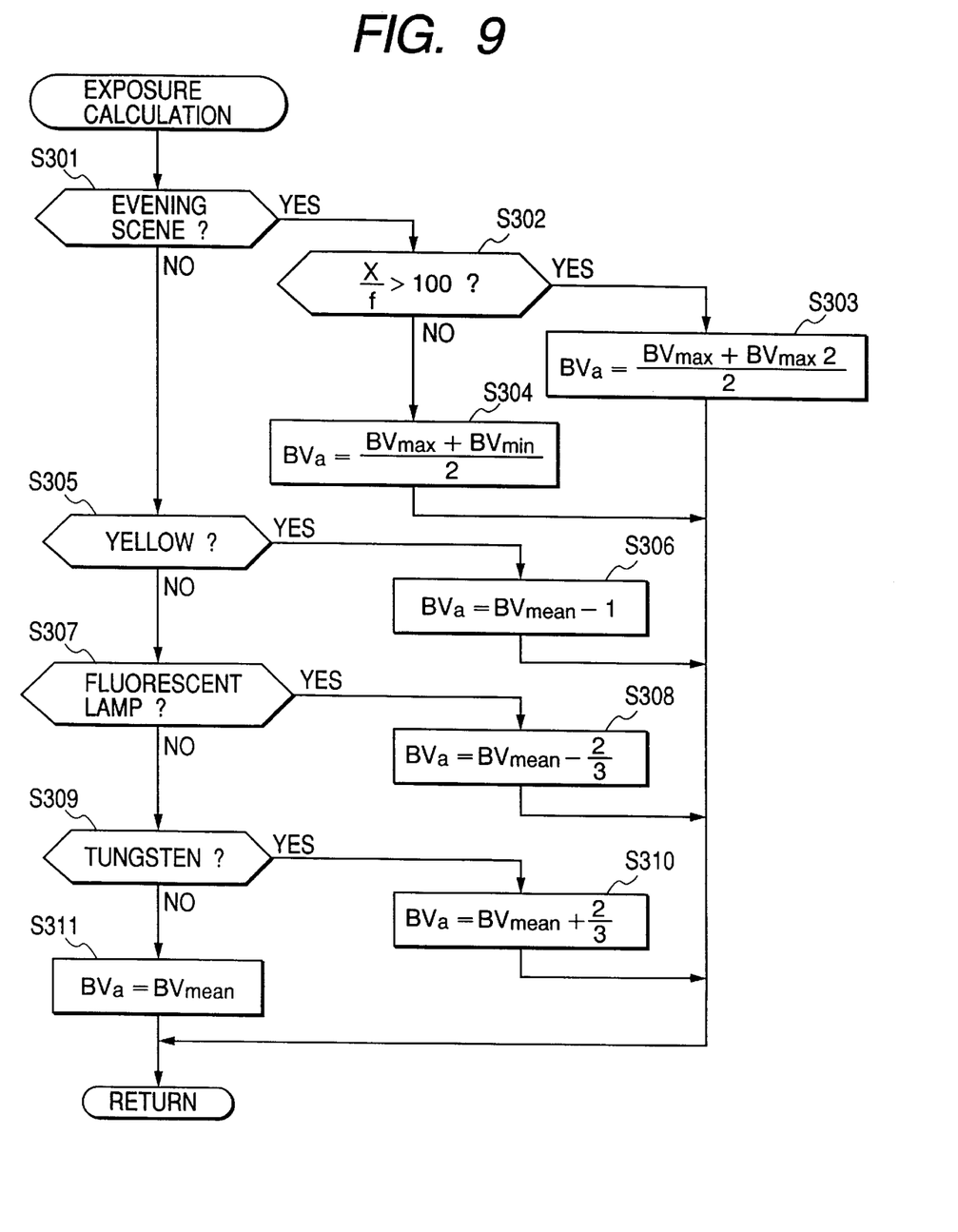
FIG. 9 is a flow chart showing the algorithm of the embodiment shown in FIG. 1.

FIG. 9 is a flow chart showing the subroutine for calculating the proper exposure value.

Upon execution of step #106 in FIG. 7, this subroutine is called and executed. It is checked in step S301 if the scene discrimination discriminates an evening scene. If Y in step S301, it is checked in step S302 if X/f>100.

Note that X is the setup distance (unit: mm) of the photographing lens obtained by the distance calculation unit 19 (FIG. 1), and indicates the distance to the principal object. Also, f is the focal length (unit: mm) of the photographing lens.

If Y in step S302, i.e., if the photographing magnification is larger than 100, it is determined that a distant, evening scene is to be photographed, and a proper exposure value BVa is calculated as per equation (1) below to adjust the exposure value to the high-luminance portion such as the sunset glow of the frame:

$$BVa=(BVmax+BVmax2)/2 \qquad (1)$$

where BVmax is the maximum one of the luminance values BV1 to BV5, and BVmax2 is the second maximum one of BV1 to BV5.

If N in step S302, i.e., if the photographing magnification is equal to or smaller than 100, since the principal object is located at a relatively near distance position, it is determined that a portrait in the evening is to be photographed, and BVa is calculated as per equation (2) below to uniformly adjust the exposure value to both the high-luminance background and low-luminance principal object:

$$BVa=(BVmax+BVmin)/2 \qquad (2)$$

where BVmin is the minimum one of the luminance values BV1 to BV5.

If it is determined in step S301 that the scene to be photographed is not an evening scene, it is checked in step S305 if the scene to be photographed is a yellowish scene. If Y in step S305, BVa is calculated by equation (3) below to prevent a yellow object with high reflectance from suffering underexposure:

$$BVa=BVmean-1 \qquad (3)$$

where BVmean is the mean value of BV1 to BV5.

If N in step S305, it is checked in step S307 if the scene to be photographed is a fluorescent lamp-illuminated scene. If Y in step S307, BVa is calculated by equation (4) below to make green fog arising from fluorescent lamp illumination inconspicuous by setting a relatively overexposure value and making the fog whitish:

$$BVa=BVmean-(2/3) \qquad (4)$$

If N in step S307, it is checked in step S309 if the scene to be photographed is a tungsten lamp-illuminated scene. If Y in step S309, a slightly underexposure value Bva is calculated as per equation (5) below to obtain a reddish, soft atmosphere peculiar to the tungsten lamp:

$$BVa=BVmean+(2/3) \qquad (5)$$

If N in step S309, a normal scene is determined, and BVa is calculated as per equation (6) below, thus ending the subroutine:

$$BVa=BVmean \qquad (6)$$

Figure 11:
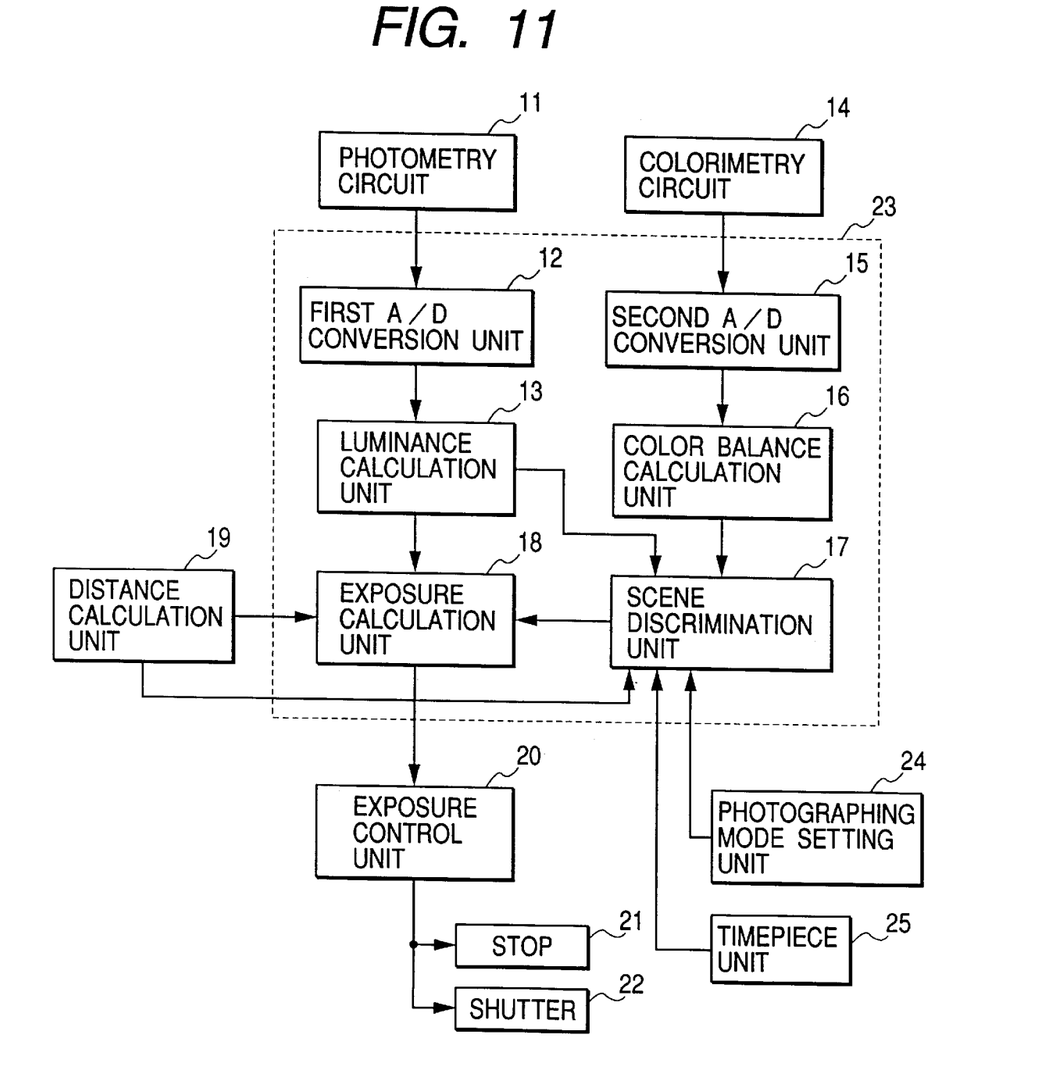
FIG. 11 is a block diagram showing the arrangement of another embodiment of a photometry device of a camera according to the present invention.

Another embodiment of a photometry device of a camera according to the present invention will be explained below with reference to FIGS. 11 and 12. FIG. 11 is a schematic block diagram showing the arrangement of this embodiment. Since the arrangement of the photometry device of this embodiment is substantially the same as that of the first embodiment shown in FIG. 1, the same reference numerals in FIG. 11 denote the same parts as in FIG. 1, and a detailed description thereof will be omitted. The difference from the arrangement shown in FIG. 1 is that the device additionally has a photographing mode setting unit 24 and timepiece unit 25, which are connected to the scene discrimination unit 17.

The photographing mode setting unit 24 determines the type of so-called program mode pertaining to determination of the shutter speed and stop in automatic exposure. In this embodiment, the program mode includes a landscape mode and silhouette mode.

The landscape mode controls the stop to have a smaller aperture value than a normal program auto mode, thus providing a sharp picture which is in focus in both the near and distant views, and giving a relatively underexposure value. This mode is effective when lenses ranging from the wide angle to standard focal length are used. In such case, for example, the aperture value is fixed at f8, and the shutter speed is controlled to change in correspondence with the luminance of the object.

The silhouette mode controls to photograph the foreground object as a silhouette by adjusting the exposure value to a light background, and is effective when the image of a person in the sunset glow scene is to be photographed. The stop and shutter speed are set in the same manner as in the landscape mode, but the photometry value undergoes exposure correction of −2.

In the photometry device of the camera of this embodiment, information pertaining to such photographing mode setups is supplied from the photographing mode setting unit 24 to the scene discrimination unit 17, which uses the supplied photographing mode information as one discrimination factor in the scene discrimination.

In this embodiment, the timepiece unit 25 also supplies time information such as the current time to the scene discrimination unit 17, which uses the supplied time information as another scene discrimination factor.

The operation of the photometry device of the camera of this embodiment will be described below with reference to FIG. 12. The operation program shown in the flow chart of FIG. 12 corresponds to the scene discrimination algorithm of the first embodiment shown in FIG. 8. Note that the operation program other than that shown in FIG. 12 is the same as the first embodiment.

Figure 12:
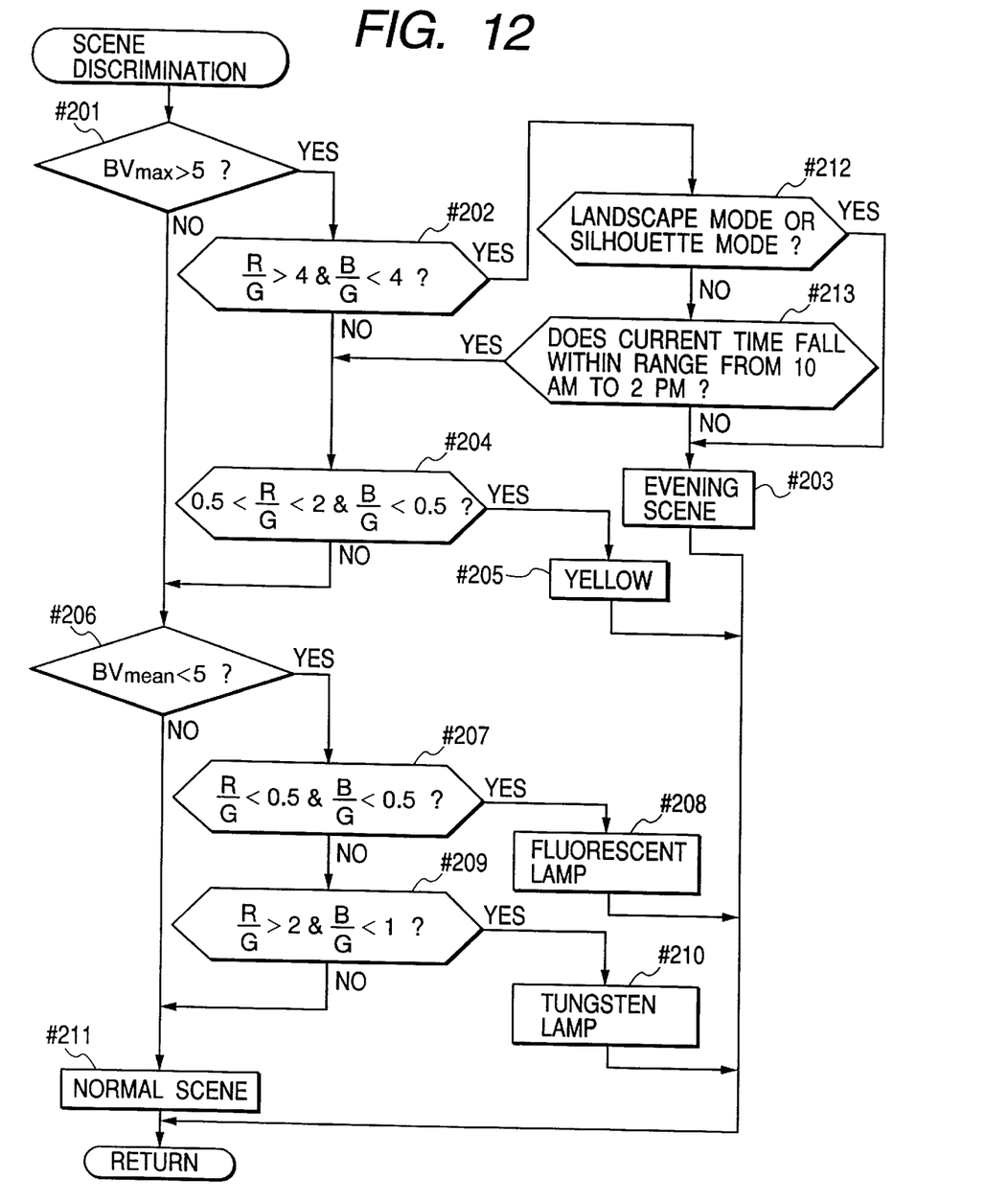
FIG. 12 is a flow chart showing the algorithm of the embodiment shown in FIG. 11.

The program shown in FIG. 12 is substantially the same as that in FIG. 8, except that two more discrimination steps are executed if YES is determined in step #202. Only the difference from FIG. 8 will be explained below.

If Y in step #202, the flow advances to step #212 to check based on the information supplied from the photographing mode setting unit 24 if the photographing mode is the landscape or silhouette mode. If Y in step #212, since the photographer is likely to be photographing an evening scene, the flow advances to step #203 to determine that the scene is an evening scene.

If N in step #212, the flow advances to step #213 to check based on the time information supplied from the timepiece unit 25 if the current time falls within the range from 10 AM to 2 PM. If Y in step #213, the flow advances to step #204 to execute the subsequent discrimination. If N in step #123, since it is determined based on the time that the photographer is likely to be photographing an evening scene (or sunrise glow), the flow advances to step #203 to determine that the scene is an evening scene.

In this way, when the photographing mode information and time information are used, scene discrimination can be done more accurately. In the example of this flow chart, the current time alone is used as the time information. Furthermore, calendar information such as month, day, and the like may be included, and discrimination may be made in accordance with the date (or season).

In each of the above embodiments, the colorimetry light-receiving element 10 is disposed in the vicinity of the vertex position of the pentagonal prism 5, and light is guided onto the light-receiving element 10 before it is reflected in the pentagonal prism. However, in these embodiments, the light-receiving element 10 may be disposed near the eyepiece lens 6. Especially, when a pair of colorimetry light-receiving elements are arranged at right and left symmetric positions near the eyepiece lens 6, the colorimetry sensitivity distribution with respect to the photographing frame can have a concentric circular pattern having the optical axis as the center, and the sensitivity at the center of the photographing frame can be improved. Hence, the color information of the principal object can be more strongly reflected in scene discrimination.

When the colorimetry light-receiving element is disposed in front of a portion above the pentagonal prism as in each of the above embodiments, the sensitivity on the top side of the photographing frame becomes relatively higher. For this reason, in a composition in which the sky of, e.g., the evening scene is present on the top portion of the frame, the color balance information can be obtained more adequately.

As described in detail above, according to the present invention, since scene discrimination of the object field can be adequately made on the basis of the color balance information of the object field, the probability of photographing with a proper exposure value can be raised.

What is claimed is:

1. A photometry device of a camera, comprising:
 a photometry circuit including a plurality of photometric elements to measure a luminance value of an object field by dividing the object field into a plurality of regions;
 a colorimetry circuit including at least one colorimetry element to measure a color balance of the object field;
 a scene discrimination unit to discriminate a scene on the basis of an output from said colorimetry circuit; and
 an exposure calculation unit to calculate a proper exposure value of the object field on the basis of outputs from said photometry circuit and said scene discrimination unit,
 wherein the plurality of photometric elements and the at least one colorimetry element are different elements, and a number of the colorimetry elements is less than a number of the photometric elements, and
 wherein when a ratio of a red output to a green output is larger than a first predetermined value, and a ratio of a blue output to the green output is smaller than a second predetermined value, said scene discrimination unit determines that a scene to be photographed is an evening scene, in which the color balance of the object field has a magenta to red tendency.

2. A photometry device of a camera, comprising:
 a photometry circuit including a plurality of photometric elements to measure a luminance value of an object field by dividing the object field into a plurality of regions;
 a colorimetry circuit including at least one colorimetry element to measure a color balance of the object field;
 a scene discrimination unit to discriminate a scene on the basis of an output from said colorimetry circuit; and
 an exposure calculation unit to calculate a proper exposure value of the object field on the basis of outputs from said photometry circuit and said scene discrimination unit,
 wherein the plurality of photometric elements and the at least one colorimetry element are different elements, and a number of the colorimetry elements is less than a number of the photometric elements, and
 wherein when a ratio of a red output to a green output falls within a range between a third predetermined value and a fourth predetermined value, and a ratio of a blue output to the green output is smaller than a fifth predetermined value, said scene discrimination unit determines that a scene to be photographed is a yellowish scene, in which the color balance of the object field has a yellow tendency.

3. A photometry device of a camera, comprising:
 a photometry circuit including a plurality of photometric elements to measure a luminance value of an object field by dividing the object field into a plurality of regions;
 a colorimetry circuit including at least one colorimetry element to measure a color balance of the object field;
 a scene discrimination unit to discriminate a scene on the basis of an output from said colorimetry circuit; and
 an exposure calculation unit to calculate a proper exposure value of the object field on the basis of outputs from said photometry circuit and said scene discrimination unit,
 wherein the plurality of photometric elements and the at least one colorimetry element are different elements, and a number of the colorimetry elements is less than a number of the photometric elements, and
 wherein when a ratio of a red output to a green output is smaller than a sixth predetermined value, and a ratio of a blue output to the green output is smaller than a seventh predetermined value, said scene discrimination unit determines that a scene to be photographed is a scene under illumination of a fluorescent lamp, in which the entire color balance of the object field has a green tendency.

4. A photometry device of a camera, comprising:

a photometry circuit including a plurality of photometric elements to measure a luminance value of an object field by dividing the object field into a plurality of regions;

a colorimetry circuit including at least one colorimetry element to measure a color balance of the object field;

a scene discrimination unit to discriminate a scene on the basis of an output from said colorimetry circuit; and an exposure calculation unit to calculate a proper exposure value of the object field on the basis of outputs from said photometry circuit and said scene discrimination unit, wherein the plurality of photometric elements and the at least one colorimetry element are different elements, and a number of the colorimetry elements is less than a number of the photometric elements, and wherein when a ratio of a red output to a green output is larger than an eighth predetermined value, and a ratio of a blue output to the green output is smaller than a ninth predetermined value, said scene discrimination unit determines that a scene to be photographed is a scene under illumination of a tungsten lamp, in which the entire color balance of the object field has a red tendency.

5. A photometry device of a camera, comprising:

a photometry circuit including a plurality of photometric elements to measure a luminance value of an object field by dividing the object field into a plurality of regions;

a colorimetry circuit including at least one colorimetry element to measure a color balance of the object field;

a scene discrimination unit to discriminate a scene on the basis of an output from said colorimetry circuit; and an exposure calculation unit to calculate a proper exposure value of the object field on the basis of outputs from said photometry circuit and said scene discrimination unit, wherein the plurality of photometric elements and the at least one colorimetry element are different elements, and a number of the colorimetry elements is less than a number of the photometric elements, and wherein when said scene discrimination unit determines that a scene to be photographed is an evening scene, said exposure calculation unit determines an exposure value placing an importance on a high-luminance portion within a frame if a photographing magnification is larger than a predetermined value, and placing an importance on both high- and low-luminance portions within the frame if the photographing magnification is not more than the predetermined value.

6. A photometry device of a camera, comprising:

a photometry circuit including a plurality of photometric elements to measure a luminance value of an object field by dividing the object field into a plurality of regions;

a colorimetry circuit including at least one colorimetry element to measure a color balance of the object field;

a scene discrimination unit to discriminate a scene on the basis of an output from said colorimetry circuit;

an exposure calculation unit to calculate a proper exposure value of the object field on the basis of outputs from said photometry circuit and said scene discrimination unit; and a timepiece unit which outputs time information, wherein the plurality of photometric elements and the at least one colorimetry element are different elements, and a number of the colorimetry elements is less than a number of the photometric elements, and wherein said scene discrimination unit discriminates the scene additionally using the time information supplied from said timepiece unit.

7. A photometry device of a camera, comprising:

a photometry circuit to measure a luminance value of an object field;

a colorimetry circuit to measure a color balance of the object field;

a scene discrimination unit to discriminate a scene on the basis of an output from said colorimetry circuit; and an exposure calculation unit to calculate a proper exposure value of the object field on the basis of outputs from said photometry circuit and said scene discrimination unit, wherein when a ratio of a red output to a green output is larger than a first predetermined value, and a ratio of a blue output to the green output is smaller than a second predetermined value, said scene discrimination unit determines that a scene to be photographed is an evening scene, in which the color balance of the object field has a magenta to red tendency.

8. A photometry device of a camera, comprising:

a photometry circuit to measure a luminance value of an object field;

a colorimetry circuit to measure a color balance of the object field;

a scene discrimination unit to discriminate a scene on the basis of an output from said colorimetry circuit; and an exposure calculation unit to calculate a proper exposure value of the object field on the basis of outputs from said photometry circuit and said scene discrimination unit, wherein when a ratio of a red output to a green output falls within a range between a third predetermined value and a fourth predetermined value, and a ratio of a blue output to the green output is smaller than a fifth predetermined value, said scene discrimination unit determines that a scene to be photographed is a yellowish scene, in which the color balance of the object field has a yellow tendency.

9. A photometry device of a camera, comprising:

a photometry circuit to measure a luminance value of an object field;

a colorimetry circuit to measure a color balance of the object field;

a scene discrimination unit to discriminate a scene on the basis of an output from said colorimetry circuit; and an exposure calculation unit to calculate a proper exposure value of the object field on the basis of outputs from said photometry circuit and said scene discrimination unit, wherein when a ratio of a red output to a green output is smaller than a sixth predetermined value, and a ratio of a blue output to the green output is smaller than a seventh predetermined value, said scene discrimination unit determines that a scene to be photographed is a scene under illumination of a fluorescent lamp, in which the entire color balance of the object field has a green tendency.

10. A photometry device of a camera, comprising:

a photometry circuit to measure a luminance value of an object field;

a colorimetry circuit to measure a color balance of the object field;

a scene discrimination unit to discriminate a scene on the basis of an output from said colorimetry circuit; and an exposure calculation unit to calculate a proper exposure value of the object field on the basis of outputs from said photometry circuit and said scene discrimination unit, wherein when a ratio of a red output to a green output is larger than an eighth predetermined value, and a ratio of a blue output to the green output is smaller than a ninth predetermined value, said scene discrimination unit determines that a scene to be photographed is a scene under illumination of the a tungsten lamp, in which the entire color balance of the object field has a red tendency.

11. A photometry device of a camera, comprising:

a photometry circuit to measure a luminance value of an object field;

a colorimetry circuit to measure a color balance of the object field;

a scene discrimination unit to discriminate a scene on the basis of an output from said colorimetry circuit; and an exposure calculation unit to calculate a proper exposure value of the object field on the basis of outputs from said photometry circuit and said scene discrimination unit, wherein when said scene discrimination unit determines that a scene to be photographed is an evening scene, said exposure calculation unit determines an exposure value placing an importance on a high-luminance portion within a frame if a photographing magnification is larger than a predetermined value, and placing an importance on both high-and low-luminance portions within the frame if the photographing magnification is not more than the predetermined value.

* * * * *